(12) United States Patent
Jalluri et al.

(10) Patent No.: US 10,088,826 B2
(45) Date of Patent: Oct. 2, 2018

(54) CNC MACHINE THERMAL GROWTH CHARACTERIZATION AND THERMAL COMPENSATION CORRECTION

(71) Applicant: Ford Global Technologies, LLC, Dearborn, MI (US)

(72) Inventors: Chandra Sekhar Jalluri, Canton, MI (US); David Norman Dilley, Royal Oak, MI (US); Trevor LeRoi Hill, Rockwood, MI (US); Amando Jose Sebastian, Novi, MI (US); Mark Goderis, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 964 days.

(21) Appl. No.: 14/463,988

(22) Filed: Aug. 20, 2014

(65) Prior Publication Data

US 2016/0054722 A1 Feb. 25, 2016

(51) Int. Cl.
*G05B 19/404* (2006.01)
*G05B 19/401* (2006.01)

(52) U.S. Cl.
CPC ......... *G05B 19/404* (2013.01); *G05B 19/401* (2013.01); *G05B 2219/37431* (2013.01);
(Continued)

(58) Field of Classification Search
CPC ............... G05B 19/401; G05B 19/404; G05B 2219/37431; G05B 2219/37509;
(Continued)

(56) References Cited

U.S. PATENT DOCUMENTS 4,583,159 A * 4/1986 Kanemoto ........... G05B 19/182
 318/572
4,628,441 A * 12/1986 Johnstone ............ G05B 19/232
 318/603

(Continued)

FOREIGN PATENT DOCUMENTS

EP 0 640 902 A2 1/1995
EP 1 300 738 A2 9/2003

OTHER PUBLICATIONS

Lu, U., et al., "Application of a Newly Developed Thermall Induced Volumetric Error Compensation Model in Iproving Dimensional Accuracy of Parts", Curtin University [online], 2013 [retrieved Jun. 7, 2017], Retrieved from Internet: <URL: https://espace.curtin.edu.au/bitstream/handle/20.500.11937/20394/188810_188810.pdf?sequence=2>, pp. 1-8.*

*Primary Examiner* — Todd Aguilera
(74) *Attorney, Agent, or Firm* — Marla Johnston; Brooks Kushman P.C.

(57) ABSTRACT

In at least one embodiment, a method of analyzing and characterizing the thermal growth of a CNC machine is provided. The method may include mounting an artifact having a bore onto a CNC machine and performing a test cycle. The test cycle may include probing the bore of the artifact to determine its location relative to the CNC machine and performing a dry cycle including one or more CNC machining processes. The method may further include calculating a deviation of the bore location from a reference relative location between the bore and CNC machine. The method may be used to improve, troubleshoot, or assess the effectiveness of CNC machine thermal compensation mechanisms. The method may start at ambient temperature and include repeating test cycles until a steady state temperature is reached in the machine.

20 Claims, 5 Drawing Sheets

(52) U.S. Cl.
CPC ........... *G05B 2219/49169* (2013.01); *G05B 2219/49207* (2013.01); *G05B 2219/49217* (2013.01); *G05B 2219/50057* (2013.01)

(58) Field of Classification Search
CPC ........... G05B 2219/49169; G05B 2219/49206; G05B 2219/49209; G05B 2219/49217; G05B 2219/49219; G05B 2219/50057; G05B 2219/50059; G05B 19/49207
USPC ......... 700/54, 160, 174–175, 193, 195, 299; 374/45
See application file for complete search history.

(56) References Cited

U.S. PATENT DOCUMENTS

| | | | | |
|---|---|---|---|---|
| 5,375,066 | A * | 12/1994 | Yee | G05B 19/231 |
| | | | | 700/193 |
| 5,444,640 | A * | 8/1995 | Hirai | G05B 19/404 |
| | | | | 700/174 |
| 6,345,213 | B1 * | 2/2002 | Graeser | B25J 9/1692 |
| | | | | 219/124.34 |
| 6,757,581 | B2 | 6/2004 | Fujishima et al. | |
| 8,255,075 | B2 | 8/2012 | Ou et al. | |
| 8,471,575 | B2 * | 6/2013 | Fregeau | G01R 31/2874 |
| | | | | 324/750.03 |
| 2002/0029115 | A1 * | 3/2002 | Moriuchi | B23Q 11/00 |
| | | | | 702/34 |
| 2011/0267082 | A1 * | 11/2011 | Fregeau | G01R 31/2874 |
| | | | | 324/750.03 |
| 2015/0276633 | A1 * | 10/2015 | Koyama | G01M 99/002 |
| | | | | 702/94 |

* cited by examiner

CNC MACHINE THERMAL GROWTH CHARACTERIZATION AND THERMAL COMPENSATION CORRECTION

TECHNICAL FIELD

The present disclosure relates to methods of characterizing thermal growth of CNC machines.

BACKGROUND

Computer numerical control (CNC) machining is widely used in the production of a variety of manufactured components, including in the automotive industry. CNC machining centers experience changes in temperature during use, which may result in reduced machining accuracy due to the thermal expansion of various components within the machine. Temperature changes may be caused by a number of factors, including machine warm-up, heat generated by the machine components, and changes in ambient temperature. Thermal expansion may cause the relative position between the work piece and the tool to be off by as much as 70 μm in the actual position compared to the commanded position. For applications requiring highly controlled tolerances, such error due to thermal expansion may be unacceptable. To address this issue, CNC machine manufacturers have implemented several approaches to counter thermal growth. One approach is thermal compensation, which may include sensing the temperature of one or more components of the machine and applying pre-calibrated algorithms to adjust the commanded position of the work piece and/or tool to compensate for thermal expansion.

SUMMARY

In at least one embodiment, a method is provided, including mounting an artifact having a bore onto a CNC machine and determining a first location of the artifact bore relative to the CNC machine at a temperature $T_1$ and a second location of the artifact bore relative to the CNC machine at a temperature $T_2$, which is greater than $T_1$. The method may further include calculating a deviation of the second location from the first location, to determine a thermal stability of the CNC machine.

The method may include operating the CNC machine to increase the temperature from $T_1$ to $T_2$. The CNC machine may include a spindle and probe and the determining step may include determining a first and second location of the artifact bore relative to the spindle and probe. In one embodiment, the method includes measuring the temperature at one or more locations on the CNC machine. A CNC machine thermal compensation mechanism may be activated prior to determining the second location. The step of determining the second location may be performed with the CNC machine thermal compensation mechanism activated and with the thermal compensation mechanism deactivated, and the calculating step may include calculating a deviation of the second location from the first location with the thermal compensation mechanism activated and deactivated.

In one embodiment, the artifact includes at least two bores and the determining step includes determining a first location of each artifact bore relative to the CNC machine at a temperature $T_1$ and a second location of each artifact bore relative to the CNC machine at a temperature $T_2$ and the calculating step includes calculating a deviation of the second location of each artifact bore from the first location of each artifact bore. In another embodiment, the determining step further includes determining a location of the artifact bore relative to the CNC machine at a plurality of temperatures greater than $T_1$ and the calculating step includes calculating a deviation of the location at each of the plurality of temperatures from the first location.

In at least one embodiment, a method is provided including mounting an artifact having a bore onto a CNC machine and performing a test cycle. The test cycle may include probing the bore of the artifact to determine its location relative to the CNC machine and performing a dry cycle including one or more CNC machining processes. The method may further include calculating a deviation of the bore location from a reference relative location between the bore and CNC machine.

The method may include repeating the test cycle one or more times and calculating a deviation of the bore location from a reference relative location between the bore and CNC machine for each test cycle. In one embodiment, a temperature of at least one location on the CNC machine is monitored and a temperature of the at least one location at a second time, $t_2$, is compared to a temperature at a first time, $t_1$. If a difference between the temperature at $t_2$ and the temperature at $t_1$ is more than a predetermined value, then an additional test cycle may be performed. In one embodiment, test cycles are repeated for at least a minimum time and for up to a maximum time, regardless of a difference between the temperatures at $t_2$ and $t_1$. The method may include comparing the deviation to a predetermined tolerance.

In one embodiment, the dry cycle includes a drilling or milling process. The dry cycle may also include one or more of a tool change, rapid feed, A/B indexing, and speed/feed. The predetermined value may be from 0.5 to 5.0° C. The CNC machine may be at ambient temperature prior to a first test cycle. In one embodiment, the probing step is performed with a temperature control mechanism turned off and with the temperature control mechanism turned on.

In at least one embodiment, a non-transitory computer readable storage medium is provided. The non-transitory computer readable storage medium may store instructions for assessing the effectiveness of a CNC machine thermal compensation mechanism. When executed by a computer, the instructions may cause the computer to execute the following functions: receiving information from a CNC machine regarding a first location of an artifact bore relative to the CNC machine at a temperature $T_1$ and a second location of the artifact bore relative to the CNC machine at a temperature $T_2$, which is greater than $T_1$, and calculating a deviation of the second location from the first location to determine the effectiveness of the CNC machine thermal compensation mechanism.

BRIEF DESCRIPTION OF THE DRAWINGS

FIG. 8 is an example of linear deviation test data for a bore in the X, Y, and Z directions with thermal compensation off and on;

FIG. 9 is an example of linear deviation test data for another bore in the X, Y, and Z directions with thermal compensation off and on; and FIG. 10 is an example of linear deviation test data for six bores in the X direction with thermal compensation on.

DETAILED DESCRIPTION

Figure 1:
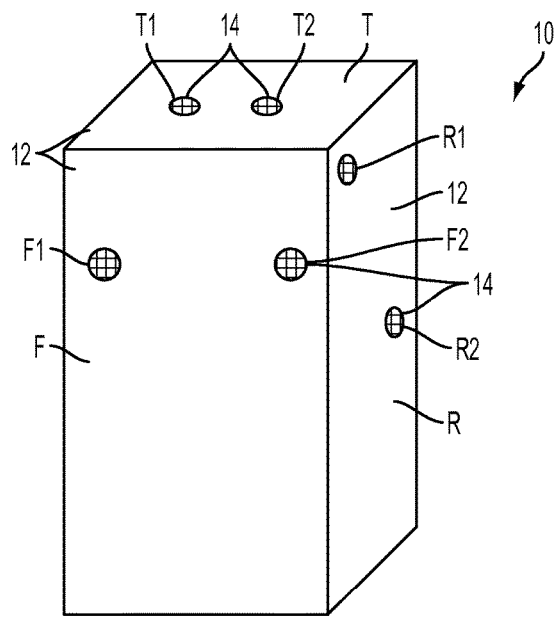
FIG. 1 is a perspective view of an artifact used to analyze CNC machine thermal growth, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A large variety of machining operations may be performed using CNC machines. For example, mills, lathes, drills, electric discharge machines (EDM), routers, cutters (e.g., water, plasma, laser, etc.), grinders, welders, stamping machines, painting machines, and others may all be configured as CNC machines. The operating principles of CNC machines are known to one of ordinary skill in the art and will not be explained in detail. In general, CNC machines include a part table that moves in the X and Y axes and a tool spindle that moves on the Z axis. The part to be processed is attached to the part table and the operation is performed by moving the part in the X and Y directions and the tool in the Z direction. Alternatively, the part may be held stationary and the tool may be moved in the X, Y, and Z directions. More advanced CNC machines may also include rotation about one or more axes using a combination of rotating tables and/or trunnions.

In general, CNC machines include numerous components, for example, a spindle, ballscrew, part table, trunnion, machine column, bed, fixture, and others. The components may each have their own geometry and may be made of dissimilar materials. Accordingly, the components may each respond differently to changes in temperature due to differences in size and shape and/or differences in thermal expansion properties (e.g., CTEs). In an attempt to compensate for the thermal expansion or thermal growth of the machine components, CNC machine suppliers have created algorithms that use temperature data gathered from one or more locations on the machine and adjust the commanded position of the tool and/or work piece such that the relative position of the tool and work piece is accurate. Thermal compensation may also include the use of various temperature control mechanisms. For example, the CNC machine may include air or liquid cooling, fans, heat sinks, or other mechanisms for removing heat or otherwise controlling the temperature.

However, thermal compensation can fail to accurately correct for thermal expansion of the CNC machine in several ways. One way is if the calculations performed in the algorithm are inaccurate. The algorithm may receive the correct inputs (e.g., temperature data) but it does not make the correct adjustments to the commanded position of the tool and/or work piece, thereby causing a deviation that exceeds an acceptable tolerance. The inaccuracies could be caused by incorrect calculations, incorrect material property data, incorrect choice of material, or other sources of error. Another way is if the inputs to the algorithm are incorrect. For example, the temperature data may not be accurate, there may be too few temperature sensors, the sensors may be placed in the wrong positions, or there may be other complications with the input data. Another potential problem is that the temperature control mechanisms are not effective. The algorithm may call for air or liquid cooling of a component or area within the machine in order to reduce the temperature, however, the cooling may be inadequate (or too effective) or the temperature control equipment may not function properly.

A failure of the thermal compensation mechanism(s) may occur for one or more dimensions. For example, the position of all three axes (X, Y, Z) may be inaccurate or only one or two may be inaccurate. In addition, if there are more than three axes, such as when a 5-axis machine is used, the positioning may be accurate in the X, Y, and Z directions for certain orientations but not in others. Furthermore, problems may only occur at certain temperatures or temperature ranges. Accordingly, it may be difficult to discover when a thermal compensation system is not performing accurately.

The demand for highly controlled tolerances in CNC machining is growing, and the thermal performance of the CNC machine is an important part of achieving tight tolerances. Purchasers of CNC machines would benefit from a method of characterizing thermal growth of the CNC machines to ensure that the machines will meet their target tolerances. With reference to FIGS. 1-5, methods of characterizing thermal growth of CNC machines and analyzing the effectiveness of their thermal compensation mechanisms are disclosed. These methods may allow for the thermal compensation mechanisms of a CNC machine to be tested to confirm that thermal compensation is working properly under varying conditions and that the required tolerances are met. If the thermal compensation is found to not be working properly, the methods may assist in diagnosing and fixing the problem(s).

With reference to FIG. 1, an artifact 10 is provided, which may be used in the disclosed methods. The artifact 10 may have highly precise dimensions and may be formed of a material having a very low coefficient of thermal expansion (CTE). Any material having a suitably low CTE may be used for the artifact 10 (e.g., less than $10 \times 10^{-6}$ m/m K). In one embodiment, the artifact is formed of a rock or mineral, such as granite. The artifact 10 may have any shape, however, in at least one embodiment it is a rectangular prism, as shown in FIG. 1. The artifact 10 may have several faces 12. For an artifact 10 that is a rectangular prism, the faces may be designated as front (F), back (B), left (L), right (R), top (T), and bottom (BT). One or more bores 14 may be formed in each face 12. The bores 14 may have highly precise dimensions (e.g., sub-micron tolerances). For example, if the bores 14 have a circular cross-section, as shown in FIG. 1, the diameter and/or depth of the bores 14 may be highly precise, and remain so over a certain temperature range. High-precision bushings (not shown) may be inserted into the bores 14 to further assist in providing highly accurate dimensions of the artifact. The bushings may also be formed of a material having a low CTE and may have very highly precise dimensions (e.g., sub-micron tolerances) that remain precise over a certain temperature range (e.g., thermally qualified precision).

The front (F), right (R), and top (T) faces 12 of artifact 10 are shown in FIG. 1. Each face 12 is shown having two bores 14, however, some faces may have zero or one bore or more than two bores. Each bore 14 may be assigned a designation based on the face on which it is located and a number. The six bores 14 shown in FIG. 1 may therefore be designated F1, F2, R1, R2, T1, and T2, as illustrated. The bores 14 may have any size (e.g., diameter and depth, for a cylindrical bore), which may correspond to the size of a milling, drilling, or other machining process that the machine is programmed to perform. The bores 14 on each face 12 may be aligned or may be randomly located. For example, the bores F1 and F2 are horizontally aligned, while R1 and R2 have a diagonal spacing or orientation.

Figure 2:
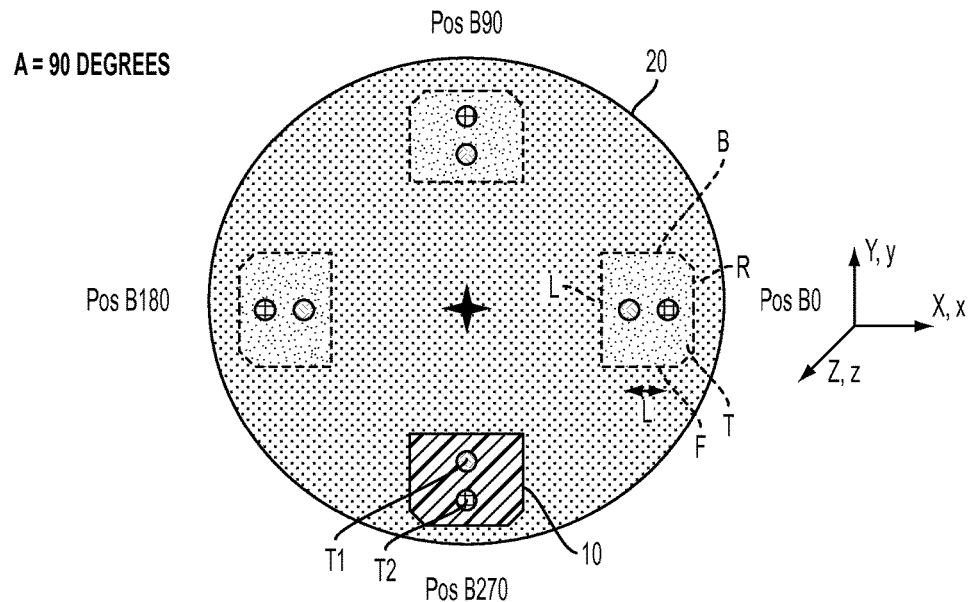
FIG. 2 is a top view of an artifact attached to a part table, according to an embodiment.
Figure 3:
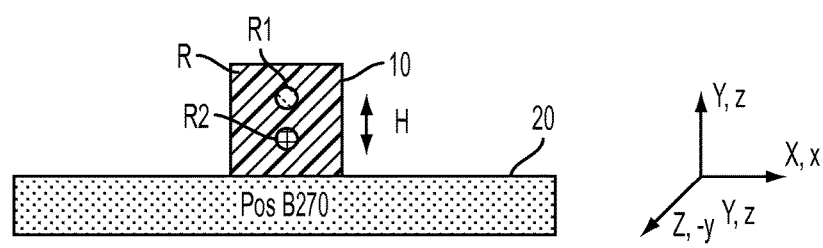
FIG. 3 is a side view of an artifact attached to a part table, according to an embodiment.
Figure 4:
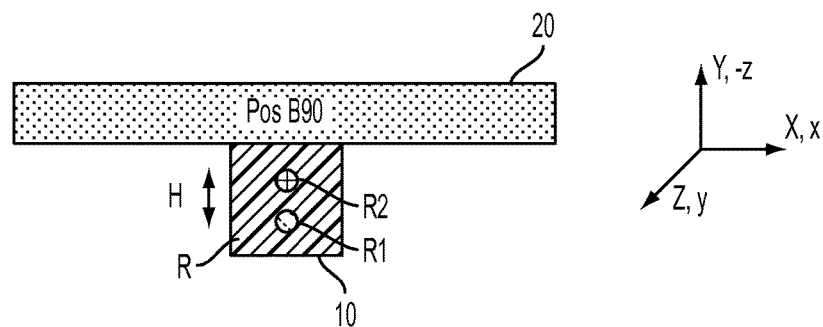
FIG. 4 is another side view the artifact of FIG. 3, with the part table rotated 180 degrees.

With reference to FIGS. 2-4, the artifact 10 may be secured to a part table 20 of a CNC machine. While CNC machines can have numerous configurations, FIGS. 2-4 are described with respect to a 5-axis, B over A configuration. In this configuration, the part table 20 may be referred to as a B-table. The B-table may rotate around the Z-axis, as shown in FIG. 2, such that the artifact may be rotated a full 360 degrees from a starting point (e.g., 0 degrees). The CNC machine may be programmed to rotate the B-table to certain positions, such as 0, 90, 180, and 270 degrees, as shown in FIG. 2. The artifact is shown in the B=270 degrees position and the 0, 90, and 180 degree positions are shown in phantom. However, additional or other positions may be used, for example, intervals of 30, 45, or 60 degrees.

In FIGS. 2-4, the spindle is configured to move in the Z-axis, the B-table rotates around the Z-axis, and the B-table may also be rotated about the X-axis by a trunnion (not shown). The angle of rotation about the X-axis may be referred to as the A position. In FIG. 2, A is 90 degrees, which results in the T1 and T2 bores of the top face of the artifact 10 facing the spindle. In FIG. 3, the B-table is still in the B=270 degrees position and the A position has been changed to 0 degrees. With the B-table rotated about the X-axis, one of the side faces 12 is now facing the spindle. Therefore, different bores 14 are accessible to the spindle, such as the R1 and R2 bores. In FIG. 4, the B-table is rotated to a B position of 90 degrees and an A position of 180 degrees. As a result, the artifact 10 has been turned upside-down relative to FIG. 3, but also rotated around the Z-axis (B position) such that the same face 14 is facing the spindle. Using a combination of A and B positions, the artifact 10 can be rotated such that each face 12 can face the spindle (except for the face attached to the part table 20). This may allow for each bore 14 to be accessed by the spindle.

The artifact 10 may be used to characterize the thermal growth of a CNC machine, such as a 5-axis machine described above. The characterization may be used for various purposes, including machine acceptance and/or troubleshooting. As described above, CNC machine suppliers often include temperature compensation mechanisms with their machines in order to correct for changes in position due to thermal expansion. The disclosed thermal growth characterization process may allow a customer or potential customer to assess the accuracy and effectiveness of the temperature compensation mechanisms before accepting final delivery or as a prerequisite for final payment (e.g., machine acceptance). The thermal growth characterization process may also allow CNC machine producers to troubleshoot their thermal compensation mechanisms under real-world conditions and in a variety of situations.

The thermal growth characterization (TGC) process may generally include a probing routine and dry cycling, which may form one test cycle. The probe may be inserted into the spindle, replacing the tool. The probing routine may include probing one or more bores (or other locating features) of an artifact to determine the location of the bore center (e.g., X and Y coordinates) and/or the bore depth (e.g., Z coordinate). Positions other than the bore center may also be used, such as the top/bottom or sides. The location may be a relative location between the bore and the CNC machine (e.g., the spindle and probe). By rotating the part table, for example, by adjusting the A and B positions described above, the artifact may be rotated such that each face is exposed to the probe (except the face attached to the part table). While each face of the artifact is facing the probe, one, a portion, or all of the bores on that face may be probed to determine the position of the bore center and/or depth. The artifact may then be rotated such that a different face is exposed to the probe and the measurements may be taken again. This process may be continued until each face and each bore has been probed. If a shorter probing routine is desired, some faces and/or bores may be skipped in the probing routine. In addition, the number of faces and/or bores probed may stay the same for each cycle or the probing routine may be changed from cycle to cycle. For example, a full probing routine may be performed for the first test cycle and the last test cycle, but a shorter probing routine could be performed for some or all of the intermediate test cycles to reduce the total time of the TGC process.

The probing routine may be performed with the CNC machine's thermal compensation (TC) mechanisms turned on or turned off. In at least one embodiment, the probing routine is performed once with the thermal compensation off and then again with the thermal compensation on (or vice versa). Running the probing routine with TC on and off may provide additional insight into the effectiveness and/or accuracy of the thermal compensation. During the probing routine, the thermal compensation may be turned on or off at any interval. For example, all bores being probed may be measured with TC off and then the probing routine may be run again with TC on. Alternatively, TC may be turned off and on during the probing of each face or the probing of each bore. For example, the bores of the top face (e.g., T1 and T2) may be probed with TC off and then probed again with TC on before rotating the artifact so that a different face is exposed to the probe.

Following (or prior to) the probing routine, a dry cycle may be performed by the CNC machine. A dry cycle may include some or all of the normal routines performed by a CNC machine when machining a work piece. In addition to the basic machining processes, such as rotating the spindle and moving the part table, other processes that occur during a machining operation may also be included in the dry cycle. For example, the dry cycle may include tool changes, rapid feeds, A/B indexing, speed/feeds, or other processes. Accordingly, the dry cycle may simulate some or all of the operations that would normally occur within the CNC machining center, but without a tool installed or a real work piece.

Prior to the first test cycle, a probe calibration or accuracy procedure may be performed. In one embodiment, a gauge R&R test may be performed prior to the test cycles. Gauge R&R (repeatability and reproducibility) tests are known to those of ordinary skill in the art and will not be explained in detail. In brief, gauge R&R tests measure the level of variability caused by the measurement system itself and compare it to the total variability observed, in order to determine the viability of the measurement system. Repeatability is concerned with the variation in measurements taken by a particular person/instrument on the same target and under the same conditions. Reproducibility is concerned with the variation caused when different operators or instruments measure the same target. The level of repeatability and reproducibility required to pass the gage R&R test may vary from customer to customer (or supplier to supplier, etc.). For example, some processes may require an R&R of up to 5%, up to 10%, up to 15%, or others. The probe calibration or accuracy procedure (e.g., gauge R&R) may be performed at a single artifact position, such as A=90 and B=0, or it may be performed at multiple artifact positions.

In at least one embodiment, the TGC process may be initiated from a cold start. A cold start may include starting the machine after it has been shut down long enough to cool to ambient conditions (e.g., temperature). Depending on the machine type, size, ambient conditions, and other factors, the required shut down time to reach ambient conditions may vary. In general, letting the machine sit for a period of 24 hours will allow for it to reach ambient temperature, however, it may take 12, 10, 8, 6 hours or less. The TGC process may be performed at any ambient temperature at which the machine may encounter during its operation. Accordingly, in at least one embodiment, no enclosure (e.g., tent) is placed around the machine and no external heating or cooling is performed (outside of typical building HVAC systems). However, in another embodiment, the ambient temperature may be controlled within a certain range. For example, the ambient temperature may be controlled to within 20-30° C., or any sub-range therein, such as 24±2° C. In general, sufficient preparation for the TGC process may include setting up a CNC machine in the morning or afternoon, letting it acclimate, and performing a cold start the following morning.

Starting the TGC process from a cold start may allow the CNC machine components to experience a wider range of temperatures. For example, the CNC machine components will start at ambient temperature and may reach a steady-state temperature during the TGC process. This may allow the TGC process to analyze more temperature and probe position data points than if the process was started on a warmed up machine. While there may be advantages to starting with a cold start, the TGC process may be initiated from a non-cold start (e.g., machine above ambient temperature).

After the CNC machine is started and the optional probe calibration or accuracy procedure has been completed, the first test cycle may be performed. As described above, the test cycle may include a probing routine followed by a dry cycle (or vice versa). During the probing routine, some or all of the bores in the artifact may be measured for their bore center coordinates (e.g., X, Y, and Z) or any other suitable reference position. The location of the bore center (or other reference point) may be relevant to the CNC machine (e.g., to the spindle and probe). In one embodiment, the probing routine during the first cycle may establish a reference location for each bore that corresponds to the programmed or intended relative location between the bore and the CNC machine. In another embodiment, the reference location for each bore may be known and stored in memory prior to the first test cycle (e.g., from a previous probing routine). During subsequent test cycles, the relative locations of each bore may be compared to the reference location for that bore to determine a deviation from the reference location. The probing routine may include measurements with thermal compensation off and on, as described above. Each face and bore may be probed, or a representative or statistically sufficient number may be probed. The probe measurement data is recorded in stored for each cycle.

After the probing routine is completed, a dry cycle may be performed by the CNC machine. They dry cycle may include any or all of the programmed steps for a CNC machining operation (e.g., a milling or drilling operation), however, the tool and the work piece are not included during the dry cycle. The dry cycle may include operations such as tool changes, rapid feeds, A/B indexing, speed/feeds, or other processes. The dry cycle therefore accurately simulates an actual CNC machining operation, resulting in accurate temperature changes within the machine. Temperature sensors within the machine, for example, attached to the machine base, a fixture, the artifact, the spindle or spindle bearing and motor, ballscrew, part table, trunnion, machine column, bed, etc., may measure, record, and store temperature data during the test cycle. Temperature data may be measured and recorded at fixed intervals throughout the test cycle (manually or programmed), at the start and stop of the test cycle, continuously throughout the test cycle, or according to any other suitable algorithm. The temperature sensors used to record the temperature data during the test cycle may be the same sensors used by the CNC machine temperature compensation mechanisms or they may be additional sensors added to the machine for the TGC process (or a combination of both).

The length of the dry cycle may vary based on the type of CNC machine and the type of machining operation being simulated. In one embodiment, the dry cycle has a length of 5 to 60 minutes, or any sub-range therein. For example, the dry cycle may last for 10 to 50 minutes, 15 to 45 minutes, or 15 to 30 minutes. At the end of the dry cycle, the test cycle may be complete. The temperature data may then be analyzed to determine if additional test cycles should be performed. In at least one embodiment, if the difference between the maximum temperature and the minimum temperature over a certain time period is less than a predetermined value, then no further test cycles are performed. If the temperature difference exceeds the predetermined value, then another test cycle (e.g., probing routine and dry cycle) is performed.

The predetermined value and the time period may vary based on the type of CNC machine and the type of machining operation being simulated. In one embodiment, the predetermined value is from 0.5 to 5° C., or any sub-range therein. For example, the predetermined value may be from 0.5 to 4° C., 0.5 to 3.0° C., or 0.5 to 2.0° C., including 0.5, 1.0, 1.5, 2.0, 2.5, 3.0, 3.5, or 4.0° C. In one embodiment, the time period may be from 0.25 to 2 hours, or any sub-range therein. For example, the time period may be 0.5 hours, 1 hour, or 1.5 hours. The time period over which the temperature difference is determined may be a moving time window. For example, if the time period is one hour, then for each temperature reading the temperature at the time of the reading may be compared to the temperature one hour prior to the reading. Alternatively, the temperature differences could be compared at regular intervals. For example, every hour after the start of the first cycle (e.g., if started at 9:00 AM, then check at 10:00 AM, 11:00 AM, noon, 1:00 PM, etc.).

In at least one embodiment, a minimum time may be set for the TGC process. Performing the TGC process for at least a certain amount of time may ensure that the CNC machine has reached or is approximately at or nearing a steady state of temperature. It may also allow at least a certain number of probing routines and dry cycles to be performed in order to generate sufficient data for analysis. In one embodiment, the minimum run-time for the TGC process may be at least one hour, for example, at least 1, 2, 3, or 4 hours. Accordingly, if the TGC process has been running for less than the minimum run-time and the temperature difference after a dry cycle is below the predetermined value, the TGC process will not terminate. Instead, additional test cycles may be performed until the minimum run-time is met. If the TGC process has been running for the minimum run-time and the temperature difference is below the predetermined value, the TGC process may be terminated without running additional test cycles. If the temperature difference is above the predetermined value, then the minimum run-time may have no effect on the TGC process.

In at least one embodiment, a maximum time may be set for the TGC process. The maximum time may be set such that the TGC process can be performed in a single day, which may allow a potential customer to determine machine acceptance on the same day as the TGC process. The maximum time may also prevent the TGC process from running past the shutdown time of the facility in which the TGC process in being performed, such that no additional human supervision is needed. In addition, a maximum time may be set that corresponds to a length of time after which steady state temperature of the CNC machine should have been attained. CNC machines generally will not continue to increase in temperature indefinitely unless there is a problem or malfunction. The maximum time may therefore serve to discontinue the TGC process so that the source of the problem can be ascertained and addressed. In one embodiment, the maximum run-time for the TGC process may be less than or equal to 24 hours. For example, the maximum run-time may be less than or equal to 18 hours, 12 hours, 8 hours, or 6 hours. Accordingly, if the TGC process run-time meets or exceeds the maximum time, the TGC process may be stopped, even if the temperature difference exceeds the predetermined value. If the TGC process run-time is less than the maximum time, then additional test cycles may be performed (if the temperature difference is above the predetermined value).

The minimum and maximum times for the TGC process may vary depending on multiple factors, including the type of CNC machine, the probing routine and dry cycle times, the ambient temperature, the type and number of operations performed during the dry cycle, or others. Accordingly, the minimum and maximum times may vary from those described above. Furthermore, the minimum and maximum times may be omitted for the TGC process. For example, if it is desirable to perform the TGC process as quickly as possible, the minimum time requirement may be removed such that the process is ended as soon as the temperature difference requirement is met. Similarly, if it is desirable to perform an extremely thorough TGC process and time or potential machine issues are not of concern, the maximum time requirement may be removed such that the TGC process goes on indefinitely until the temperature difference requirement is met or the process is stopped manually.

Figure 5:
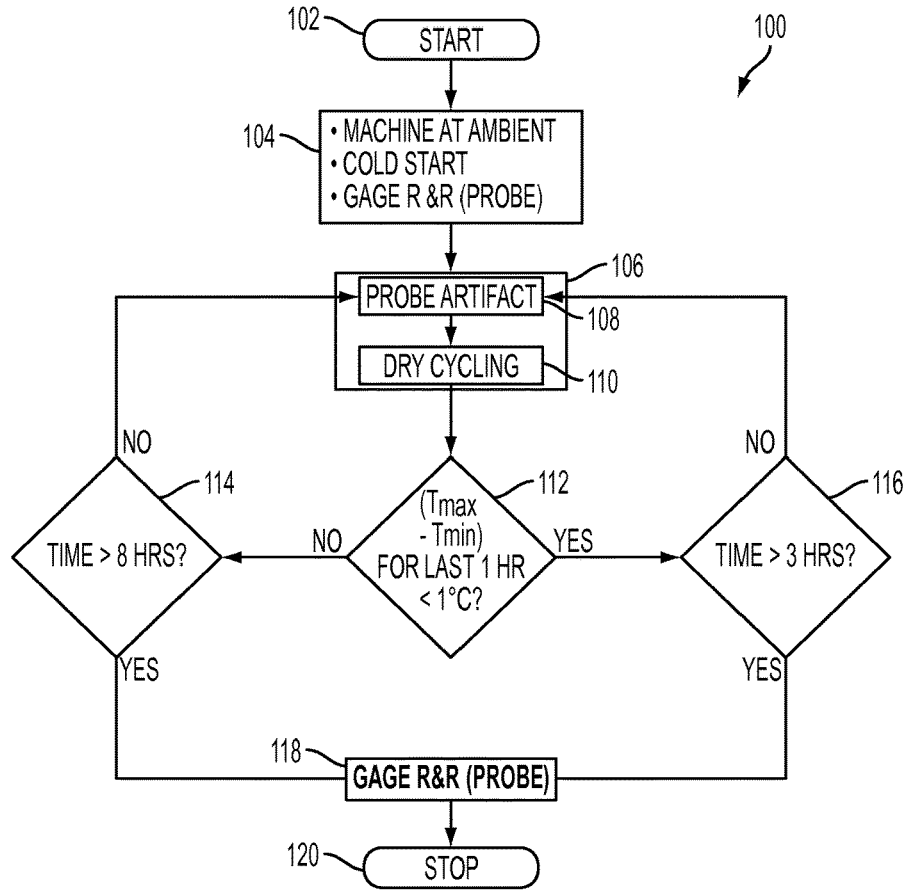
FIG. 5 is an algorithm for CNC machine thermal growth characterization according to an embodiment.

With reference to FIG. 5, a flowchart of the TGC process 100 is shown, according to an embodiment. At step 102, the TGC process is initiated. At step 104, the CNC machine is cold started at ambient temperature and a gage R&R test is performed on the probe. If the results of the gage R&R test are acceptable, a test cycle is performed at step 106. The test cycle includes a probing step 108 and a dry cycling step 110. During the first test cycle, the probing step 108 may establish a reference location for each bore, as described above. During subsequent test cycles, the probing step 108 may measure the location of each bore, which may be relative to the CNC machine. The deviation of each bore location from the reference location may also be calculated. Location, deviation, and temperature data may be recorded and stored during each test cycle 106.

After the test cycle, a temperature difference calculation is made at step 112. If the difference between the maximum temperature and the minimum temperature is greater than 1° C. over the last one hour (i.e., $T_{max}-T_{min}$ is not less than 1° C. over the last one hour), then it is determined that the temperature is not at or near a steady state. If the temperature difference is not less than 1° C. over the last hour, then at step 114 the run-time of the TGC process is compared to the maximum run-time of 8 hours. If the TGC process has not been running for 8 hours or more, another test cycle is run at step 106. If the TGC process has been running for 8 hours or more, additional test cycles are not performed and a second gage R&R test is performed on the probe at step 118.

If the temperature difference calculation in step 112 determines that the difference between the maximum temperature and the minimum temperature is less than 1° C. over the last one hour (i.e., $T_{max}-T_{min}$ is less than 1° C. over the last one hour), then it is determined that the temperature is at or near a steady state. If the temperature difference is less than 1° C. over the last hour, then at step 116 the run-time of the TGC process is compared to the minimum run-time of 3 hours. If the TGC process has not been running for 3 hours, another test cycle is run at step 106. If the TGC process has been running for 3 hours, additional test cycles are not performed and a second gage R&R test is performed on the probe at step 118. After the second gage R&R test, the TGC process is ended at step 120.

The TGC process 100 shown in FIG. 5 is an example of a TGC process and is not limiting on the disclosed thermal growth characterization process. As described above, the parameters such as the minimum time, maximum time, and temperature difference, and temperature difference time period may vary depending on the CNC machine, the type and length of the probing routine and dry cycle, and other factors. Furthermore, not all steps in the process 100 may be required, as described above. For example, the minimum and/or maximum time requirements may be removed. In addition the gage R&R test may be replaced by a different probe calibration or accuracy test, or it may be removed altogether.

Following a TGC process, temperature, location, and deviation data may be retrieved and analyzed. The data may be used to determine if the thermal compensation mechanisms of the CNC machine are working adequately. Depending on the user, customer, or supplier, the amount of deviation that is acceptable from the reference/intended relative position of the probe may differ. For applications where very tight tolerances are required, the acceptable deviation may be small. However, if tight tolerances are not required, then the acceptable deviation may be relatively high. Furthermore, the acceptable deviation may change depending on which axis is being analyzed. For example, for some applications the Z-axis deviation may not be as important as the X and Y-axis deviations (or vice versa). In one embodiment, the acceptable deviation in any or all directions may be within 1 to 50 µm, or any sub-range therein, such as 5 to 30 µm, 5 to 25 µm, 5 to 15 µm, or about 10 µm.

The acquired deviation data may be used to analyze the effectiveness of the thermal compensation mechanisms of the machine, troubleshoot those mechanisms, make a purchasing or machine acceptance decision, or any other purpose. If the thermal compensation works effectively for the deviation requirements, then a customer may accept final delivery of the machine, complete payment, or otherwise finalize a purchase agreement. A machine supplier may use the TGC process to do quality control of their machines and their thermal compensation mechanisms. If the thermal compensation mechanisms are found to not work sufficiently well in more or more axes, then a customer may refuse final delivery or payment or may require the supplier to make the required adjustments to meet the deviation requirements. A machine supplier may also use a failed TGC process to troubleshoot problems with their thermal compensation mechanisms. For example, the calculations used in the thermal compensation algorithms may be inaccurate or temperature control mechanisms (e.g., cooling systems, fans, etc.) may not be working properly.

The temperature data acquired during the thermal growth characterization process may also be valuable in assessing the effectiveness of the thermal compensation mechanisms or troubleshooting. For example, if the TGC process runs for the maximum allowed run-time, it may be an indication that something is wrong with the machine. In general, CNC machines will reach relatively steady state temperatures within 6-10 hours. Therefore, if the machine runs for 8 hours and the temperature is still rising, then there may be an issue with the machine. For machines that do reach a relatively steady state temperature, the temperature data shows how quickly steady state occurs and what temperatures the various machine components experience.

To provide additional context for various aspects of the present disclosure, the following discussion is intended to provide a brief, general description of a suitable computing environment in which the various aspects of the disclosure may be implemented. While one or more embodiments of the disclosure relates to the general context of computer-executable instructions that may run on one or more computers, those skilled in the art will recognize that the subject matter also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the disclosure may also be practiced in distributed computing environments where certain tasks are performed by remote processing devices that are linked through a communications network. In a distributed computing environment, program modules may be located in both local and remote memory storage devices.

Figure 6:
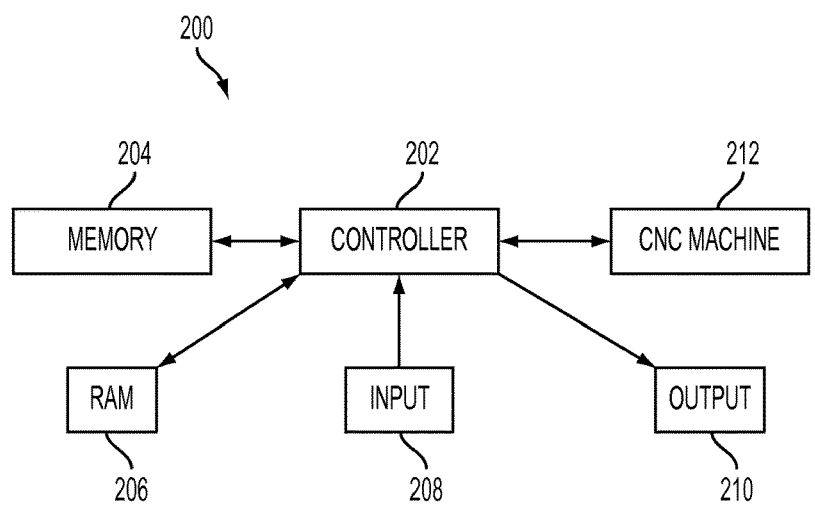
FIG. 6 is a simplified schematic of a computer system that may be used to perform the algorithm of FIG. 5, according to an embodiment.

The methods and processes disclosed may be performed by a computer or computers, which may be part of a CNC machine (or otherwise in communication with the machine). Alternatively, data may be generated by the CNC machine and transferred to a computer that is not in communication with the CNC machine. With reference to FIG. 6, a simplified schematic of a computer system 200 that may be used to perform the disclosed functions is shown. The computer system may include a controller 202, such as a processor or microprocessor. It may further include memory 204 and RAM 206. The computer may have an input 208, such as a mouse, keyboard, or other interface, and an output 210, such a display. The computer system may receive information from the CNC machine 212, such as time, temperature, position, deviation, and other information, as described above.

The computer system 200 is a simplified schematic, and it is recognized that the computer(s) may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the computers may be configured to execute a computer-program that is embodied in a non-transitory computer readable medium that is programmed to perform any number of the functions as disclosed. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

An exemplary environment for implementing various aspects of the present disclosure may include a computer that includes a processing unit, a system memory and a system bus. The system bus couples system components including, but not limited to, the system memory to the processing unit. The processing unit may be any of various commercially available processors. Dual microprocessors and other multi-processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

A number of program modules may be stored in the drives and RAM, including an operating system, one or more application programs, other program modules and program data. All or portions of the operating system, applications, modules, and/or data may also be cached in the RAM. It is appreciated that the subject matter of the present disclosure may be implemented with various commercially available operating systems or combinations of operating systems.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

EXAMPLES

Figure 7:
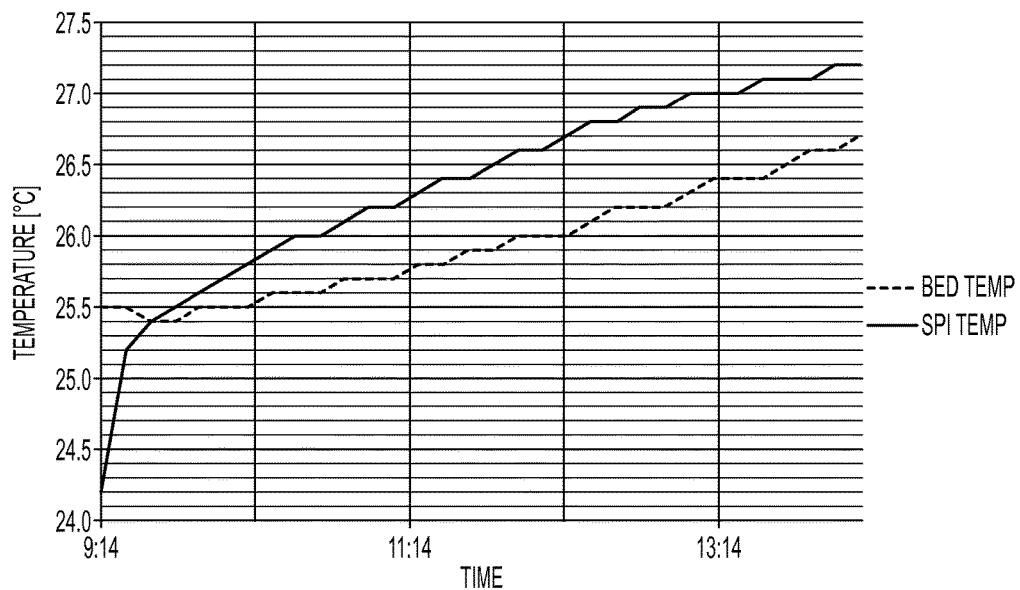
FIG. 7 is an example of temperature test data showing the change in temperature of a CNC machine bed and spindle over time.

With reference to FIGS. 7-10, examples of temperature and deviation data collected using the disclosed TGC processes are shown. FIG. 7 shows temperature data from sensors attached to the CNC machine bed and spindle. As seen in the graph, the spindle temperature rises quickly from the cold start before increasing at a more gradual rate. In contrast, the bed temperature has a more gradual temperature rise from the cold start. Depending on the minimum run-time, temperature difference, and temperature difference time period, a thermal growth characterization process having the temperature data in FIG. 7 could continue to perform additional test cycles, or it could be stopped due to the slowing of the temperature rise.

Figure 8:
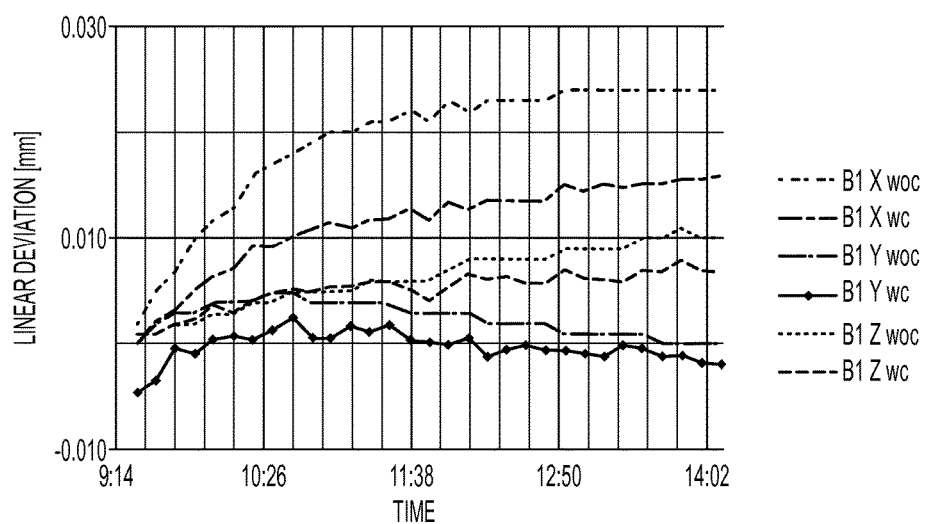
Figure 9:
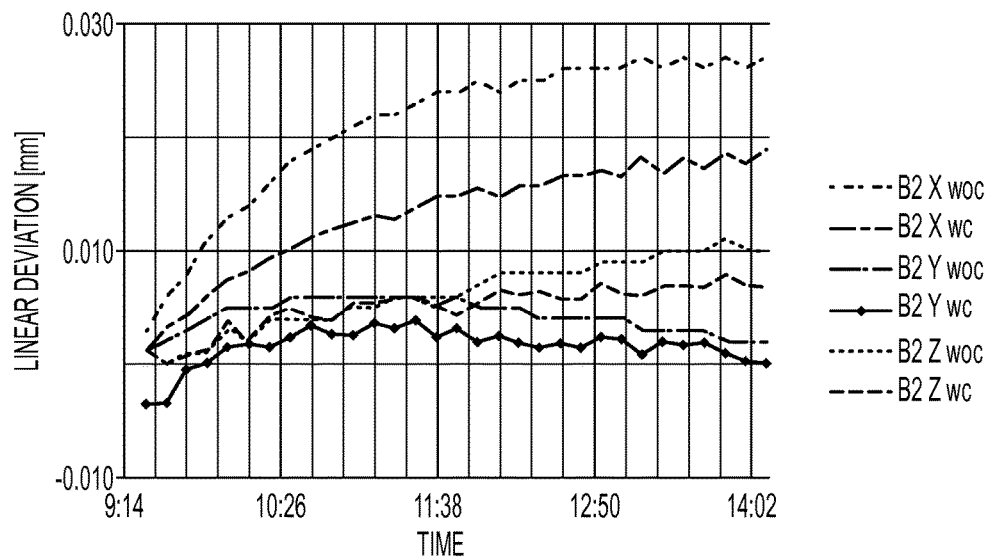

FIGS. 8 and 9 show test data for two bores in an artifact, bore 1 (B1) and bore 2 (B2). The bores were probed in the X, Y, and Z directions without and with the CNC machine's thermal compensation ("woc" and "wc," respectively). The acceptable linear deviation for these tests was 10 µm, with thermal compensation on. As shown in FIGS. 8 and 9, the Y and Z deviations of both bores stay within 10 µm from their starting/reference position with thermal compensation on. The Y deviation stays within 10 µm even with the thermal compensation off and the Z deviation comes very close to the 10 µm limit with thermal compensation off near the end of the test. In contrast, however, the X deviation of both bores significantly exceed the 10 µm acceptable limit with the thermal compensation off and with it on. Accordingly, the TGC process has detected that the X-axis thermal compensation is not working effectively.

Figure 10:
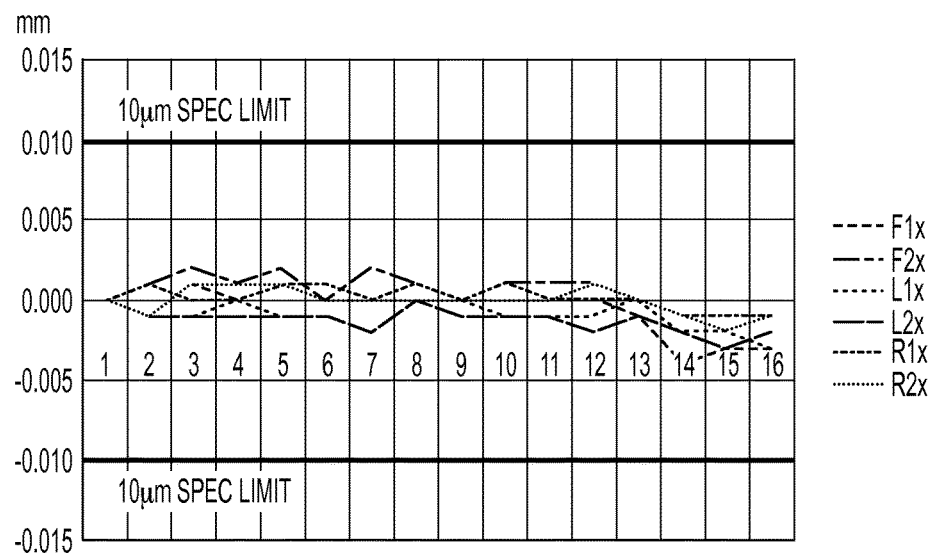

FIG. 10 shows test data for X deviation of six bores (F1, F2, L1, L2, R1, R2) in an artifact. The test data was taken following a correction to the thermal compensation mechanism of a CNC machine that failed to meet a 10 µm acceptance requirement in the X direction (such as shown in FIGS. 7-8). After the thermal compensation mechanism was corrected, another TGC process was performed on six bores with the thermal compensation on to determine if the corrections were sufficient. The data for the X-axis deviation of each bore is shown, with the data offset to have a uniform starting position. As shown by the graph, each of the X-axis deviations is well within the 10 µm limit. In fact, each bore is within 5 µm of the reference position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    mounting an artifact having a pre-existing bore onto a CNC machine including a spindle and probe and a thermal compensation mechanism;
    operating the CNC machine;
    determining, via a controller, a first location of the artifact bore relative to the spindle and probe at the start of operation of the CNC machine;
    determining, via the controller, a second location of the artifact bore relative to the spindle and probe, when the thermal compensation mechanism is deactivated while the CNC machine continues to operate and a third location of the artifact bore relative to the spindle and probe, when the thermal compensation mechanism is activated while the CNC machine continues to operate;
    calculating, via the controller, a first deviation of the second location from the first location and a second deviation of the third location from the first location; and
    correcting, via the controller, the thermal compensation mechanism in response to the first and second deviations being each outside of an acceptable deviation.

2. The method of claim 1, wherein the operating step includes increasing the temperature of the CNC machine.

3. The method of claim 1 further comprising measuring the temperature at one or more locations on the CNC machine.

4. The method of claim 1, wherein the artifact includes at least two bores and the determining steps are carried out on each of the at least two bores.

5. The method of claim 4, wherein the calculating step is carried out on each of the at least two bores.

6. A method comprising:
    mounting an artifact having a pre-existing bore onto a CNC machine including a spindle and probe and a thermal compensation mechanism;
    performing a test cycle of the CNC machine, including:
        probing the artifact bore to determine a first location relative to the spindle and probe;
        probing the artifact bore to determine a second location relative to the spindle and probe, when the thermal compensation mechanism is deactivated, a third location relative to the spindle and probe, when the thermal compensation mechanism is activated; and
        performing a dry cycle of the CNC machine including one or more CNC machining processes; and
    calculating, via a controller, a first deviation of the second location from the first location and a second deviation of the third location from the first location; and
    correcting, via a controller, the thermal compensation mechanism in response to the first and second deviations being outside of an acceptable deviation.

7. The method of claim 6 further comprising repeating the test cycle one or more times and performing the calculating step for each test cycle.

8. The method of claim 6 further comprising monitoring a temperature of at least one location on the CNC machine and comparing a temperature of the at least one location at a second time, $t_2$, to a temperature at a first time, $t_1$.

9. The method of claim 8, wherein if a difference between the temperature at $t_2$ and the temperature at $t_1$ is more than a predetermined value then an additional test cycle is performed.

10. The method of claim 9, wherein the predetermined value is from 0.5 to 5.0° C.

11. The method of claim 8, wherein test cycles are repeated for at least a minimum time and for up to a maximum time, regardless of a difference between the temperatures at $t_2$ and $t_1$.

12. The method of claim 6, wherein the dry cycle includes a drilling or milling process.

13. The method of claim 6, wherein the dry cycle further includes a tool change.

14. The method of claim 6, wherein the CNC machine is at ambient temperature prior to a first test cycle.

15. A non-transitory computer readable storage medium, storing instructions that, when executed by a computer, causes the computer to execute the following function:
    receiving information from a CNC machine including a spindle and probe and a thermal compensation mechanism regarding a first location of an artifact bore relative to the spindle and probe, a second location of the artifact bore relative to the spindle and probe, when the thermal compensation mechanism is deactivated during operation of the CNC machine, and a third location of the artifact bore relative to the spindle and probe, when the thermal compensation mechanism is activated while the CNC machine continues to operate; and calculating a first deviation of the second location from the first location and a second deviation of the third location from the first location; and correcting the thermal compensation mechanism in response to the first and second deviations being each outside of an acceptable deviation.

16. The non-transitory computer readable storage medium of claim 15, wherein the instructions, when executed by the computer, cause the computer to execute the following further function: operating the CNC machine to increase the temperature from $T_1$ to $T_2$.

17. The non-transitory computer readable storage medium of claim 15, wherein the instructions, when executed by the computer, cause the computer to execute the following further function: measuring the temperature at one or more locations on the CNC machine.

18. The non-transitory computer readable storage medium of claim 15, wherein the acceptable deviation is 10 μm.

19. The non-transitory computer readable storage medium of claim 15, wherein the acceptable deviation is 5 μm.

20. The non-transitory computer readable storage medium of claim 15, wherein the instructions, when executed by the computer, cause the computer to execute the following further function: monitoring a temperature of at least one location on the CNC machine and comparing a temperature of the at least one location at a second time, $t_2$, to a temperature at a first time, $t_1$.

* * * * *